(12) United States Patent
Fischer et al.

(10) Patent No.: US 6,197,879 B1
(45) Date of Patent: *Mar. 6, 2001

(54) METHODS OF PREPARING INORGANIC PIGMENT DISPERSIONS

(75) Inventors: Stephen A. Fischer, Yardley; Michael S. Wiggins, Lansdale; Bruce Matta, Emmaus; Eric Nowicki, Hatfield, all of PA (US)

(73) Assignee: Henkel Corporation, Gulph Mills, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/713,314

(22) Filed: Sep. 13, 1996

Related U.S. Application Data

(60) Provisional application No. 60/006,096, filed on Oct. 31, 1995, and provisional application No. 60/017,456, filed on May 17, 1996.

(51) Int. Cl.⁷ .......................... C08L 35/06; C08F 222/08
(52) U.S. Cl. .......................... 524/824; 524/431; 524/556; 524/559; 526/272; 526/318.2; 526/318.25; 526/318.3; 526/318.45; 526/318.6
(58) Field of Search .............................. 526/318, 318.2, 526/318.45, 345, 272; 524/431, 559, 824, 556; 523/351, 202; 427/372.2

(56) References Cited

U.S. PATENT DOCUMENTS

| | | | |
|---|---|---|---|
| 2,647,094 | 7/1953 | Hahn | 260/23 |
| 2,772,252 | 11/1956 | Briskin et al. | 260/80.5 |
| 2,795,564 | 6/1957 | Conn et al. | 260/29.6 |
| 2,851,444 | * 9/1958 | Wesp et al. | 526/318 |
| 2,875,166 | 2/1959 | Hopkins | 260/29.6 |
| 3,035,004 | 5/1962 | Glavis | 260/29.7 |
| 3,037,952 | 6/1962 | Jordan, Jr. et al. | 260/29.6 |
| 3,238,159 | 3/1966 | DiBenedetti et al. | 260/17.4 |
| 3,356,627 | 12/1967 | Scott | 260/29.6 |
| 3,484,261 | 12/1969 | Pratt et al. | 106/308 |
| 3,620,729 | 11/1971 | Ray-Chaudhuri et al. | 96/1.8 |
| 3,703,567 | 11/1972 | Sutter et al. | 260/880 |
| 3,794,608 | * 2/1974 | Evani et al. | 526/318 |
| 3,980,602 | 9/1976 | Jakubauskas | 260/29.6 |
| 4,025,483 | 5/1977 | Ramig, Jr. | 260/29.6 |
| 4,098,987 | 7/1978 | Barua et al. | 526/304 |
| 4,129,472 | 12/1978 | Hobes et al. | 526/307.6 |
| 4,200,713 | 4/1980 | Wingler et al. | 526/64 |
| 4,243,430 | 1/1981 | Sperry et al. | 106/308 |
| 4,244,863 | 1/1981 | Hemmerich et al. | 260/42.55 |
| 4,283,320 | 8/1981 | Carroll et al. | 260/29.6 |
| 4,342,858 | 8/1982 | Herman et al. | 526/317 |
| 4,410,673 | 10/1983 | Schulz et al. | 526/202 |
| 4,486,581 | * 12/1984 | Walinsky et al. | 526/318 |

(List continued on next page.)

FOREIGN PATENT DOCUMENTS

| | | |
|---|---|---|
| 25 02 172 | 7/1976 | (DE) . |
| 2734204 | 7/1977 | (DE) . |
| 0 047 889 | 8/1981 | (EP) . |
| 0 100 444 | 7/1983 | (EP) . |
| 60-248709 | 12/1985 | (JP) . |
| WO 97/01587 | 1/1997 | (WO) . |

OTHER PUBLICATIONS

Derwent Patent Abstract (WPI) 88–026348.
Deutsche Patentsparche in der Lacktechnik 104(6):58–63 (1998).
Patent Abstract of Japan (12(181):C–499 (1988).
Patent Abstract of Japan 13(241):C–604 (1989).
"Styrene Polymers" *Encyclopedia Of Polymer Science And Engineering*, vol. 16, pp. 1–21 (John Wiley & Sons, Inc., N,Y., N.Y., 1989).
"Acrylic And Methacrylic Acid Polymers", *Enclopedia Of Polymer Science And Engineering*, vol. 1, pp. 211–234 (John Wiley & Sons, Inc., N.Y., N.Y., 1985).
"Chain Transfer, " *Encyclopedia Of Polymer Science And Engineering*, vol. 3, pp. 288–290 (John Wiley & Sons, N.Y., N.Y., 1985).
"Latices", *Encyclopedia Of Polymer Science And Engineering*, vol. 8, pp. 647–677 (John Wiley & Sons, Inc., N.Y., N.Y., 1987).
"Coatings", *Encyclopedia Of Polymer Science and Engineering*, vol. 3, pp. 552–575 (John Wiley & Sons, N.Y., N.Y., 1985).
"Tamol™ 165A (Jan. 1994)," "Taml™ 731A (Jul. 1995)," *Rohm and Haas Company*.
"Peroxy Compounds", *Encyclopedia of Polymer Science and Engineering*, vol. 11, pp. 1–21 (John Wiley & Sons, Inc., Ny, Ny 1988).
"Maleic and Fumari Polymers ", *Encyclopedia of Polymer Science and Engineering*, vol. 9, pp. 225–294 (John Wiley & Sons, Inc., NY, NY 1987).

*Primary Examiner*—Tae Yoon
(74) *Attorney, Agent, or Firm*—John E. Drach; Henry E. Millson, Jr.; John Daniel Wood

(57) ABSTRACT

A polymer useful as an inorganic pigment dispersant is provided. The polymer is derived from monomers consisting essentially of an ethylenically unsaturated aromatic monomer, an ethylenically unsaturated dicarboxylic acid monomer, and an ethylenically unsaturated monocarboxylic acid monomer. The total amount of said ethylenically unsaturated acid monomers is sufficient to permit said polymer to associate with an inorganic pigment in an aqueous medium in a manner which disperses said inorganic pigment in said aqueous medium to form a stable aqueous dispersion of said inorganic pigment, and the amount of said ethylenically unsaturated aromatic monomer is sufficient to reduce the water sensitivity of a dried coating of a latex paint comprised of said stable aqueous dispersion of said inorganic pigment. A process of preparing a polymer useful as an inorganic pigment dispersant and a method of preparing an inorganic pigment dispersion useful in the preparation of latex paints are also provided.

8 Claims, No Drawings

U.S. PATENT DOCUMENTS

| | | | |
|---|---|---|---|
| 4,514,540 | 4/1985 | Peck | 524/514 |
| 4,628,071 | 12/1986 | Morgan | 524/832 |
| 4,677,174 | 6/1987 | Alexander et al. | 526/240 |
| 4,948,847 | 8/1990 | Morita et la. | 526/64 |
| 4,954,562 | 9/1990 | Anderson | 524/779 |
| 5,138,004 | 8/1992 | dePierne et al. | 526/293 |
| 5,160,370 | 11/1992 | Suga | 106/20 |
| 5,229,472 | 7/1993 | Binsbergen et al. | 526/64 |
| 5,268,437 | 12/1993 | Holy et al. | 526/229 |
| 5,270,412 | 12/1993 | Rauterkus et al. | 526/258 |
| 5,275,372 | 1/1994 | Boeckeler | 249/134 |
| 5,288,828 | 2/1994 | Harris et al. | 526/320 |
| 5,296,531 | 3/1994 | Belde et al. | 524/556 |
| 5,326,843 | 7/1994 | Lorah et al. | 526/318.6 |
| 5,349,036 | 9/1994 | Simpson et al. | 526/320 |
| 5,369,204 | 11/1994 | Wu et al. | 526/304 |
| 5,410,078 | 4/1995 | Harris | 562/480 |
| 5,451,644 | 9/1995 | Fiarman et al. | 526/93 |
| 5,473,031 | 12/1995 | Tinetti et al. | 526/273 |

\* cited by examiner

METHODS OF PREPARING INORGANIC PIGMENT DISPERSIONS

CROSS-REFERENCE TO RELATED APPLICATIONS

This application claims priority from U.S. provisional application Ser. No. 60/006,096, filed Oct. 31, 1995, and U.S. provisional application Ser. No. 60/017,456, filed May 17, 1996, the disclosures of which are incorporated herein by reference.

FIELD OF THE INVENTION

The present invention relates to polymers useful in preparing inorganic pigment dispersions and methods of preparing such polymers, methods of preparing inorganic pigment dispersions useful in the manufacture of latex paints, and latex paints prepared therewith.

BACKGROUND OF THE INVENTION

Paint coatings are protective surface coatings applied to substrates and cured to form dry continuous films for decorative purposes as well as to protect the substrate. Consumer latex paint coatings are air-drying aqueous coatings applied primarily to architectural interior or exterior surfaces, where the coatings are sufficiently fluid to flow out, form a continuous paint film, and then dry at ambient temperatures to form continuous films.

A paint coating is ordinarily comprised of an organic polymeric binder, pigments, and various paint additives. The polymeric binder acts as a fluid vehicle for the pigments and imparts rheological properties to the fluid paint coating. In dried paint films, the polymeric binder functions as a binder for the pigments and provides adhesion of the dried paint film to the substrate. The pigments may be organic or inorganic and functionally contribute to opacity and color in addition to durability and hardness.

The manufacture of paint coatings involves the preparation of a polymeric binder, mixing of component materials, grinding of pigment in the presence of a pigment dispersant, mixing the pigment grind with the polymeric binder, and thinning to commercial standards. High speed dispersers or dissolvers are used in the grinding step to disperse the pigments into the polymeric binder solution.

Considerable research effort has been directed toward eliminating volatile organic compounds (VOC) from consumer paints and especially from latex paints to eliminate emission problems as well as the odor problems. (VOC is a measure of volatile organic compounds in a paint composition according to U.S. EPA Rule 24. See also ASTM Manual Series MNL4 and ASTM D-3960 and ASTM D-2369-87.) Thus, an urgent need exists to eliminate consumer VOC problems with air drying paints.

Polyacrylic acid in its neutralized form has been used to prepare aqueous pigment dispersions, particularly dispersions of titanium dioxide. Polyacrylic acid disperses the pigment well and contributes little, if at all, to the VOC of the latex paint into which the pigment dispersion is incorporated. However, polyacrylic acid also tends to contribute to water sensitivity of the dried paint coating. For example, an exterior paint coating is more susceptible to water damage as a result of precipitation and an interior paint coating may be damaged when scrubbed with aqueous liquids, e.g. soap and water. A pigment dispersant with a reduced contribution to the water sensitivity of the dried paint coating is therefore desirable.

SUMMARY OF THE INVENTION

This invention relates to a polymer useful as an inorganic pigment dispersant, said polymer being derived from monomers consisting essentially of an ethylenically unsaturated aromatic monomer, an ethylenically unsaturated dicarboxylic acid monomer, and an ethylenically unsaturated monocarboxylic acid monomer, wherein the total amount of said ethylenically unsaturated dicarboxylic acid monomer and said ethylenically unsaturated monocarboxylic acid monomer is sufficient to permit said polymer to associate with an inorganic pigment in an aqueous medium in a manner which disperses said inorganic pigment in said aqueous medium to form a stable aqueous dispersion of said inorganic pigment, and wherein the amount of said ethylenically unsaturated aromatic monomer is sufficient to reduce the water sensitivity of a dried coating of a latex paint comprised of said stable aqueous dispersion of said inorganic pigment.

This invention also relates to a process of preparing a polymer useful as an inorganic pigment dispersant, said process comprising dissolving monomers consisting essentially of an ethylenically unsaturated aromatic monomer, an ethylenically unsaturated dicarboxylic acid monomer, and an ethylenically unsaturated monocarboxylic acid monomer in a solvent consisting essentially of a major amount by weight of a water-miscible organic solvent having chain transfer activity and a minor amount by weight of water and polymerizing said monomers in said solution.

This invention also relates to a method of preparing an inorganic pigment dispersion useful in the preparation of latex paints, said method comprising dispersing an inorganic pigment in an aqueous medium further comprised of a dispersing polymer, said aqueous medium being essentially free of volatile organic solvents, and said dispersing polymer being derived from monomers consisting essentially of an ethylenically unsaturated aromatic monomer, ethylenically unsaturated dicarboxylic acid monomer, and an ethylenically unsaturated monocarboxylic acid monomer, wherein the amount of said ethylenically unsaturated acid monomer is sufficient to permit said polymer to associate with an inorganic pigment in an aqueous medium in a manner which disperses said inorganic pigment in said aqueous medium to form a stable aqueous dispersion of said inorganic pigment, and wherein the amount of said ethylenically unsaturated aromatic monomer is sufficient to reduce the water sensitivity of a dried coating of a latex paint comprised of said stable aqueous dispersion of said inorganic pigment. This invention also relates to an inorganic pigment dispersion comprising an inorganic pigment and a dispersing polymer as described above in an aqueous medium.

This invention also relates to latex paints comprising the inorganic pigment dispersion composition of this invention and to a method of coating a substrate comprising contacting a surface of a substrate with a composition comprising a latex paint binder and an inorganic pigment dispersion of this invention and drying said surface to form a film of said composition in contact with said surface.

With respect to certain embodiments, this invention relates to a polymer produced by the process of polymerizing monomers consisting essentially of:

(i) an aromatic monomer having the formula $CH_2=C(R^1)(R^2)$ wherein $R^1$ is an aromatic group having from 6 to 10 carbon atoms, and $R^2$ is hydrogen or methyl, (ii) a di-acid monomer selected from the group of compounds having the formula $R^3R^4C=C(R^5)(C(O)OH)$ wherein $R^3$, $R^4$, and $R^5$ are hydrogen, carboxyl, lower alkyl, or carboxyl-substituted lower alkyl, provided that one of R³, R⁴, and R⁵ must be carboxyl or carboxyl-substituted lower alkyl, one of R³, R⁴, and R⁵ must be hydrogen said di-acid monomer having from 4 to 6 carbon atoms, and anhydrides of said compounds, and (iii) an mono-acid monomer having the formula $CH_2=C(R^6)(C(O)OH)$ wherein R⁶ is hydrogen or methyl, or mixtures thereof. Said polymer is typically produced by polymerization of the monomers while in an aqueous alcohol solution. As used herein, the term "lower alkyl" refers to alkyl groups having from 1 to 4 carbon atoms, typically methyl and ethyl.

In typical embodiments, the monomers consist essentially of one or more of said aromatic monomers in an amount of from about 30% to about 50% by weight, and one or more of said di-acid monomers in an amount of from about 20% to about 40% by weight, and one or more of said mono-acid monomers in an amount of from about 20% to about 40% by weight. The polymer typically has a molecular weight (e.g. weight average) of from about 1,000 to about 20,000.

Certain of the polymers of this invention can also be represented by the formula:

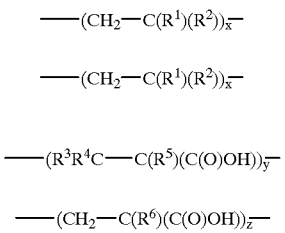

wherein R¹, R², R³, R⁴, R⁵, and R⁶ are as defined above, and the total of y and z is sufficient to permit said polymer to associate with an inorganic pigment in an aqueous medium in a manner which disperses said inorganic pigment in said aqueous medium to form a stable aqueous dispersion of said inorganic pigment, and wherein x is sufficient to reduce the water sensitivity of a dried coating of a latex paint comprised of said stable aqueous dispersion of said inorganic pigment. The subscripts x, y, and z represent the mole ratios of the monomeric units. Thus, the subscripts will be integers for a mono-disperse polymer composition and will be average values when expressed in relation to a poly-disperse polymer composition. Further, the formula is not intended to convey that the polymer is a block copolymer. Thus, both random and block copolymers are within the scope of the formula.

A preferred class of polymers within the scope of this invention have the formula set forth above wherein R¹ is phenyl, R² is hydrogen, R³ is hydrogen, R⁴ is carboxyl, R⁵ is hydrogen, and R⁶ is methyl, and the ratio of x:y:z is chosen such that the polymer is comprised of monomeric units of formula A in an amount from about 30% to about 50% by weight, monomeric units of formula B in an amount from about 20% to about 40% by weight, and monomeric units of formula C in an amount of about 20% to about 40% by weight, and the sum of x, y, and z is chosen such that the polymer has a molecular weight (e.g. weight average) of from about 1,000 to about 20,000.

DETAILED DESCRIPTION OF THE INVENTION

In certain aspects, this invention relates to novel polymers and to a method of making such polymers. In other aspects, this invention also relates to the use of the novel polymers to disperse an inorganic pigment in an aqueous medium and to the resulting dispersions. In still other aspects, this invention also relates to latex paint compositions comprised of a latex paint binder and an inorganic pigment dispersion of this invention and to a method of coating a substrate which employs such latex paint compositions. Each of these aspects will be addressed in turn below.

The polymers of this invention can be generally characterized as terpolymers, i.e. they have repeating units derived from at least three different monomers: an aromatic monomer, an acid monomer, and an amide monomer. Thus, the starting materials for preparing the novel polymers of this invention are ethylenically unsaturated aromatic compounds, ethylenically unsaturated acid compounds, and ethylenically unsaturated amide compounds.

The monomeric unit A is derived from an ethylenically unsaturated aromatic compound. Examples of the ethylenically unsaturated aromatic compounds include monovinyl aromatic hydrocarbons containing from 8 to 12 carbon atoms and halogenated derivatives thereof having halo-substituted aromatic moieties. Specific examples include styrene, alpha-methylstyrene, vinyl toluene (e.g. a 60/40 mixture by weight of meta-methylstyrene and para-methylstyrene), meta-methylstyrene, para-methylstyrene, para-ethylstyrene, para-n-propylstyrene, para-isopropylstyrene, para-tert-butylstyrene, ortho-chlorostyrene, para-chlorostyrene, alpha-methyl-meta-methylstyrene, alpha-methyl-para-methylstyrene, tert-butyl styrene, alpha-methyl-ortho-chlorostyrene, and alpha-methyl-para-chlorostyrene. Certain vinyl aromatic compounds are discussed in "Styrene Polymers", *Encyclopedia of Polymer Science and Engineering*, vol. 16, pp. 1–21 (John Wiley & Sons, Inc., N.Y., N.Y., 1989), the disclosure of which is incorporated by reference herein.

The monomeric unit B is derived from an ethylenically unsaturated dicarboxylic acid monomer or an anhydride thereof. Examples of such dicarboxylic acids include itaconic acid, citraconic acid, maleic acid, fumaric acid, mesaconic acid and mixtures thereof. A preferred example is maleic anhydride.

The monomeric unit C is derived from an ethylenically unsaturated monocarboxylic acid monomer. Examples of such monocarboxylic acid monomers include acrylic acid, beta-acryloxypropionic acid, methacrylic acid, crotonic acid, and alpha-chloroacrylic acid. Preferred examples are acrylic acid and methacrylic acid. Such acids are described in "Acrylic and Methacrylic Acid Polymers", *Encyclopedia of Polymer Science and Engineering*, vol. 1, pp. 211–234 (John Wiley & Sons, Inc., N.Y., N.Y., 1985), the disclosure of which is incorporated herein by reference.

Further examples of acid monomers that may be useful include the partial esters of unsaturated aliphatic dicarboxylic acids and particularly the alkyl half esters of such acids. Examples of such partial esters are the alkyl half esters of itaconic acid, fumaric acid and maleic acid wherein the alkyl group contains 1 to 6 carbon atoms. Representative members of this group of compounds include methyl acid itaconic, butyl acid itaconic, ethyl acid fumarate, butyl acid fumarate, and methyl acid maleate. These acid monomers generally have greater molecular bulk than the preferred monomer, acrylic acid, and thus, may have less hydrophilic character than the preferred monomer, acrylic acid. Thus, the use of such acid functional partial esters as the acid monomer may allow one to reduce the relative amount of aromatic monomer and yet obtain the same reduction in water sensitivity.

It is the acid groups of the B and C monomeric units that are responsible for the ability of the polymer to associate with an inorganic pigment and, thus, stably disperse the inorganic pigment in an aqueous medium. The aromatic group of the A monomeric unit that is believed to be at least partially responsible for the reduced water sensitivity of a latex paint prepared from the inorganic pigment dispersion. The polymer should form a stable pigment dispersion, but also have reduced water sensitivity. Therefore, the amount of the A monomeric units should be sufficient to obtain the desired reduction in water sensitivity of a latex paint prepared therewith. Likewise, the amount of the B and monomeric units should be sufficient to obtain the desired degree of stability of the pigment dispersion.

In general, the polymer should contain greater than 10% by weight of A monomeric units, preferably more than 25%. The amount of the A monomeric unit will, however, generally be a minor amount, e.g. from about 35% to about 50% by weight of the polymer, preferably from about 40% to about 45%. The amount of the B monomeric unit will typically be from about 20% to about 60% by weight of the polymer, more typically from about 30% to about 50%. The amount of the C monomeric unit will likewise typically be from about 20% to about 60% by weight of the polymer, more typically from about 30% to about 50%. However, the precise characteristics desired of the aqueous pigment dispersion and the latex paint prepared therefrom will influence the determination of what is an optimal amount of the A and B monomeric units, the precise identity of each monomer and the amount of each monomer affecting, as discussed herein, properties of the polymer which are important to its utility as an inorganic pigment dispersant.

While the preferred dispersing polymers, based on styrene as the aromatic monomer, maleic anhydride as the dicarboxylic acid monomer, and methacrylic acid as the monocarboxylic acid monomer are prepared without additional comonomers, other monoethylenically unsaturated polymerizable monomers useful in minor proportion (e.g. less than 10% by weight of the total monomer composition) as comonomers with the aromatic and acid monomers may be useful in preparing the polymers of this invention. Examples of other monomers include the vinylidene halides, vinyl halides, acrylonitrile, methacrylonitrile, vinyl esters such as vinyl formate, vinyl acetate and vinyl propionate, and mixtures of ethylene and such vinyl esters, acrylic and methacrylic acid esters of alcohol ethers such as diethylene glycol monoethyl or monobutyl ether methacrylate, $C_1$–$C_{10}$ alkyl esters of beta-acryloxypropionic acid and higher oligomers of acrylic acid, mixtures of ethylene and other alkylolefins such as propylene, butylene, pentene and the like, vinyl ethers such as methyl vinyl ether, ethyl vinyl ether, vinyl 2-methoxyethyl ether, vinyl 2-chloroethyl ether and the like, hydroxy functional vinyl monomers such as 2-hydroxyethyl methacrylate, 2-hydroxyethyl acrylate, 3-hydroxypropyl methacrylate, butanediol acrylate, 3-chloro-2-hydroxypropyl acrylate, 2-hydroxypropyl acrylate, and 2-hydroxypropyl methacrylate.

In addition to monoethylenically unsaturated monomers, the monomers from which the polymer is prepared may also be comprised of an ethylenically unsaturated monomer having at least two sites of ethylenic unsaturation, i.e. a di- or higher multi-ethylenically unsaturated monomer. Examples of multiethylenic monomers include alkenyl acrylates or methacrylates (e.g. allyl methacrylate), di-alkenyl arenes, particularly di-alkenyl benzenes (e.g. divinyl benzene), di-alkenyl ethers (e.g. ethylene glycol di-allyl ether and pentaerythritol di-allyl ether), di-acrylamides (e.g. methylene-bis-acrylamide, trimethylene-bis-acrylamide, hexamethylene-bis-acrylamide, N, N'-diacryloylpiperazine, m-phenylene-bis-acrylamide, and p-phenylene-bisacrylamide), di- or higher multi-acrylates (e.g. diethylene glycol diacrylate, propylene glycol dimethacrylate, ethylene glycol dimethacrylate, polyethylene glycol diacrylate, bis(4-acryloxypolyethoxyphenyl)-propane, 1,3-butylene glycol dimethacrylate, 1,5-pentanediol diacrylate, neopentyl glycol diacrylate, 1,6-hexanediol diacrylate, and polypropylene glycol diacrylate, pentaerythritol triacrylate, trimethylolpropane triacrylate, trimethylolpropane trimethacrylate, pentaerythritol tetraacrylate, triethylene glycol, and dimethacrylate). Such multifunctional monomers may be useful as crosslinking agents to modifying the molecular weight of the polymer and improve the paint film's water resistant properties. The amount of the multiethylenic monomers will be a minor amount, typically from about 0.01 % to about 3%, more typically from about 0.1 % to about 1.5%, by weight of total monomers, because the polymer should not be so highly crosslinked that it is rendered insoluble.

While it is thus conceivable that the polymer will contain monomeric units derived from monomers other than the aromatic monomer and the acid monomer, in preferred embodiments, the polymer is prepared by solution polymerization of monomers consisting essentially of:

(a) from about 30% to about 60%, preferably from about 35% to about 45%, by weight based on the total weight of monomers, of an ethylenically unsaturated aromatic monomer having less than twelve carbon atoms, preferably styrene, (b) from about 20% to about 50%, preferably from about 25% to about 35%, by weight based on the total weight of monomers, of an ethylenically unsaturated dicarboxylic acid having less than six carbon atoms, preferably maleic anhydride, and (c) from about 20% to about 40%, preferably from about 25% to about 35%, by weight based on the total weight of monomers, of an ethylenically unsaturated monocarboxylic acid having less than six carbon atoms, preferably acrylic acid and/or methacrylic acid.

In general, the polymer will have a molecular weight (e.g. weight average) of from about 1,000 to about 20,000, typically from about 1,500 to about 10,000, and more typically from about 2,000 to about 6,000. The acid value (expressed as mg of KOH per gram of polymer) of the polymer should be greater than about 240, typically greater than 250, more typically from about 300 to about 500, and even more typically from about 395 to about 425.

In the polymerization process of this invention, the monomers are dissolved in a solvent consisting essentially of a major amount by weight of a water-miscible organic solvent having chain transfer activity and a minor amount by weight of water. The monomers are then polymerized in said solution.

The solvent of this invention has two components. It is an aqueous solvent in that one of the components is water. The other component is an organic solvent that must meet two criteria. First, the organic solvent must be miscible with water in the proportion in which the water is present in the solvent system. It should be noted that the identity and amounts of the monomers in the solution may affect the miscibility of the organic solvent and the water. Thus, the organic solvent must not only be miscible with water, but miscible with the resulting solution as a whole. Accordingly, by "water-miscible" it is meant that the organic solvent will not form a discrete second liquid phase in the reaction medium.

The organic solvent must also have chain transfer activity. Chain transfer is discussed in "Chain Transfer", *Encyclopedia of Polymer Science and Engineering,* vol. 3, pp. 288–290 (John Wiley & Sons, Inc., N.Y., N.Y., 1985), the disclosure of which is incorporated herein by reference. Chain transfer refers to the termination of a growing polymer chain and the start of a new one by a chain transfer agent. The chain transfer coefficients of solvents are available in the literature, e.g. J. Brandrup and E. H. Immergut, *Polymer Handbook,* (2d ed. John Wiley & Sons, Inc., N.Y., N.Y., 1975), the disclosure of which is incorporated herein by reference. Typically, the organic solvent will be an oxygenated hydrocarbon, for example an alcohol, ketone (e.g. acetone), or ester (e.g. ethyl acetate), typically having no more than about six (preferably no more than about three) carbon atoms per oxygen atom. Typically, the organic solvent will be a lower alkanol, e.g. a $C_1$–$C_6$, more typically a $C_2$–$C_4$ alkanol, e.g. isobutanol. The preferred organic solvent is isopropanol.

The relative amounts of the organic solvent and water in the solvent system must be selected so that the monomers dissolved therein remain miscible with the solution during the course of the polymerization reaction. Typically, the organic solvent will be present in a major amount (i.e. more than 50% by weight) and the water will be present in a minor amount by weight. The weight ratio of organic solvent to water will typically be from about 1.5:1 to 8:1, more typically from about 2:1 to about 6:1, and even more typically from about 2.5:1 to about 3.5:1.

The polymerization medium may also contain a mercapto-functional compound, i.e. a compound having a free thiol group, —SH. Examples of such compounds include alkyl, aryl, and/or aralkyl mercaptans, particularly those having from 8 to 18 carbon atoms, e.g. n-octyl mercaptan, n-dodecyl mercaptan, n-hexadecyl, n-octadecyl mercaptan, benzyl mercaptan, and thiophenol, mercapto-esters such as methyl mercaptopropionate, dodecyl mercaptopropionate, isodecyl thioglycolate and 2-ethylhexyl mercaptoacetate, mercapto-acids, e.g. mercaptopropionic acid, mercapto-alcohols, 2-hydroxyethyl mercaptan, mercapto-1,2-propanediol, and 1-mercapto-2-propanol. Generally, the mercapto-functional compound will be used in an amount of from about 0.05% to about 10% by weight, more typically from about 0.1 % to about 3% by weight, and even more typically from about 0.2% to about 0.6%, based on the weight of the monomers.

The polymerization process may be a thermal or redox type; that is, free radicals may be generated solely by the thermal dissociation of an initiator species or a redox system may be used. A polymerization initiator of the free radical type, such as ammonium or potassium persulfate, may be used alone or as the oxidizing component of a redox system, which also includes a reducing component such as potassium metabisulfite, sodium thiosulfate or sodium formaldehyde sulfoxylate. The reducing component is frequently referred to as an accelerator. The initiator and accelerator, commonly referred to as catalyst, catalyst system or redox system, are typically used in proportion from about 0.01% to 10% or less each, based on the weight of monomers to be copolymerized. Examples of redox catalyst systems include t-butyl hydroperoxide/sodium formaldehyde sulfoxylate/Fe (II), and ammonium persulfate/sodium bisulfite/sodium hydrosulfite/Fe(II).

A preferred catalyst is an organic or inorganic peroxide, e.g. hydrogen peroxide. Examples of organic peroxides, include hydroperoxides, peroxy acids, and peroxy esters, e.g. ditertiary butyl peroxide, benzoyl peroxide, 2,4-dichlorobenzoyl peroxide, tertiary butyl hydroperoxide, 1,5-dimethyl-2,5-bis (hydroperoxy)-hexane, peroxyacetic acid, peroxybenzoic acid, tertiary butyl peroxypivalate, tertiary butyl peroxyacetic acid, and tertiary butyl peroxyoctoate. Organic peroxy compounds are described in *Encyclopedia of Polymer Science and Engineering,* vol. 11, pp. 1–21 (John Wiley & Sons, Inc., N.Y., N.Y., 1988), the disclosure of which is incorporated herein by reference.

The polymerization temperature may be from room temperature to 90° C. (with isobutanol) or 80° C. (with isopropanol), or more if the reaction zone is pressurized to maintain the solvent as a liquid, and may be optimized for the catalyst system employed, as is conventional. The temperature of the reaction vessel during the polymerization may be controlled by cooling to remove heat generated by the polymerization reaction or by heating the reaction vessel.

Additional chain transfer agents including polyhalogen compounds may also be desirable in the polymerization mixture to moderate polymer molecular weight. Examples of chain transfer agents which may be used include long chain alcohols such as lauryl alcohol or t-octyl alcohol, carbon tetrachloride, tetrachloroethylene and trichlorobromoethane. Generally from about 0.001 to 3% by weight of an additional chain transfer agent, based on the weight of the monomer mixture, may be used.

To minimize the tendency of the acid monomer to separate into a second aqueous phase, the pH of the solvent system will typically be adjusted to retain at least a portion, and preferably most, of the acid monomer in the free acid form. Thus, the pH of the solvent system will be on the acid side of neutral, e.g. from about 2 to about 4.

Inorganic Pigment Dispersions

In one aspect, this invention relates to a method of preparing a pigment dispersion useful in the preparation of latex paints. The method in its broadest conception comprises dispersing a pigment in an aqueous medium further comprised of a dispersing polymer, said aqueous medium being essentially free of volatile organic solvents. While the acid monomer which forms part of the dispersing polymer will typically be in the free acid form during the solution polymerization, the aqueous medium in which the inorganic pigment is to be dispersed will typically have a neutral, or even alkaline, pH such that the monomeric unit derived from the acid monomer will typically be in the form of a charged anion, e.g. carboxylate.

The dispersing polymers of this invention form the pigment dispersions of this invention when dissolved in an aqueous solvent containing ammonia or an organic amine. The polymer is added to the solvent typically in an amount of about 30–40% polymer solids based on the weight of the solvent. Typically, the aqueous solvent will contain only ammonia to avoid any contribution to the volatile organic content of the pigment dispersion, but examples of suitable organic amines that can be used in place of or with ammonia include primary, secondary, and tertiary amines which can act as a base to salt polymer. Specific examples of organic amines are the dialkyl aminoalkanols such as 2-(N,N-dimethylamino)ethanol and 2-(N, N-diethylamino)ethanol.

The ammonia or organic amine is present in the aqueous solution in an amount sufficient to solubilize the dispersing polymer. In general, the ammonia or organic amine will be present in the aqueous solution in an amount sufficient to theoretically neutralize the acid groups of the polymer, i.e., the amount of ammonia or organic amine is stoichiometrically equivalent to or greater than the acid value of the polymer. A large excess of organic amine should be avoided because retention of the organic amine in the dried paint coating may adversely affect the water resistance of the coating.

The amount of the acid monomer used to prepare the dispersing polymer should be sufficient in relation to the amount of the aromatic monomer to yield a polymer that is sufficiently capable of associating with the inorganic pigment such that a stable pigment dispersion is formed. If the polymer is not sufficiently capable of associating with the inorganic pigment, observable precipitation of the pigment during the intended shelf life of the pigment dispersion or the latex paint prepared therewith may occur.

The pigment dispersion is typically made by first dissolving the dispersing polymer in water. The dispersion will typically be essentially free of organic solvents, e.g. alcohol solvents such as the short chain aliphatic alcohols having from 2 to 4 carbon atoms, e.g. the lower alkanols, ethanol, n-propanol, isopropanol and n-butanol. These solvents can contribute to the volatile organic content (a.k.a. VOC) of the dispersion and any paint prepared therefrom, which has environmental disadvantages.

One of the ingredients of the pigment dispersions of this invention is an inorganic pigment or colorant. The generic term pigment includes both colorant pigments and opacifying pigments. The term "colorant pigment" is specifically used in this specification to refer to both pigments and dyes which impart a distinct color (i.e. a hue as opposed to white (the absence of color) or black and/or shades of gray) to the composition.

The pigment of the dispersion may be a colorant pigment, i.e. the pigment will impart a color to the pigment dispersion, to a printing ink prepared therefrom, and to the surface of a substrate printed with such a printing ink. The colorant pigments useful in this invention will typically include black, inorganic red, inorganic yellow, as well as violet, orange, green, and brown. Useful pigments include for instance ferrite yellow oxide, red iron oxides, ferric iron oxide brown (which is a blend of red, yellow, and black iron oxides), tan oxide (which is a similar blend), raw sienna and burnt sienna, raw and burnt umber, carbon black, lampblack.

The inorganic pigment will typically, however, be an opacifying pigment. For purposes of this invention, white opacifying pigments are not considered to be colorant pigments. Opacifying pigments are generally pigments having a refractive index of at least about 1.8. Typical white opacifying pigments include rutile and anatase titanium dioxide. The dispersions can further contain non-opacifying filler or extender pigments often referred to in the art as inerts and include clays, such as kaolinite clays, silica, talc, mica, barytes, calcium carbonate, and other conventional filler pigments. All filler or extender pigments have fairly low refractive indices and can be described generally as pigment other than opacifying pigment.

The pigment dispersions of this invention may be prepared as follows. The pigment is mixed with an aqueous solution of the dispersing polymer and, at a properly adjusted viscosity, dispersed thereinto with ball mill, sand mill, high-shear fluid flow mill, Cowles Dissolver, Katy Mill or the like. The process of dispersing causes agglomerates of the pigment particles to deagglomerate and the dispersing polymer causes the deagglomerated particles of pigment to be wetted with the aqueous solution. This wetting thus inhibits the reagglomeration of the pigment particles.

The pigment dispersion will typically be characterized as a slurry of the pigment in an aqueous medium which also contains a minor amount of the dispersing polymer. Typically, the weight ratio of inorganic pigment to aqueous medium is from about 1:1 to about 10:1, more typically from about 1.5:1 to about 5:1, and even more typically from about 2:1 to about 4:1. The weight ratio of inorganic pigment to dispersing polymer on a solid basis is typically from about 10:1 to about 1000:1, more typically from about 50:1 to about 500:1, and even more typically from about 75:1 to about 150:1.

Latex Paint Compositions

The invention includes latex paint compositions containing an emulsion or dispersion of a water-insoluble polymer and a pigment dispersion of the invention. The water-insoluble polymers may be any of the types conventionally utilized in latex paint compositions and include natural rubber latex ingredients and synthetic latices wherein the water-insoluble polymer is an emulsion polymer of mono- or poly-ethylenically unsaturated olefinic, vinyl or acrylic monomer types, including homopolymers and copolymers of such monomers. Latices and latex paints are discussed extensively in "Latices", *Encyclopedia of Polymer Science and Engineering,* vol. 8, pp. 647–677 (John Wiley & Sons, Inc., N.Y., N.Y., 1987), and "Coatings", *Encyclopedia of Polymer Science and Engineering,* vol. 3, pp. 615–675 (John Wiley & Sons, Inc., N.Y., N.Y., 1985), the disclosures of which are incorporated herein by reference.

Specifically, the water-insoluble emulsion polymer may include poly (vinyl acetate) and copolymers of vinyl acetate (preferably at least 50% by weight) with one or more of vinyl chloride, vinylidene chloride, styrene, vinyltoluene, acrylonitrile, methacrylonitrile, acrylamide, methacrylamide, maleic acid and esters thereof, or one or more of the acrylic and methacrylic acid esters mentioned in U.S. Pat. Nos. 2,795,564 and 3,356,627, which polymers are well-known as the film-forming component of aqueous base paints; homopolymers of $C_2$–$C_{40}$ alpha olefins such as ethylene, isobutylene, octene, nonene, and styrene, and the like; copolymers of one or more of these hydrocarbons with one or more esters, nitriles or amides of acrylic acid or of methacrylic acid or with vinyl esters, such as vinyl acetate and vinyl chloride, or with vinylidene chloride; and diene polymers, such as copolymers of butadiene with one or more of styrene, vinyl toluene, acrylonitrile, methacrylonitrile, and esters of acrylic acid or methacrylic acid. It is also quite common to include a small amount, such as 0.5 to 2.5% or more, of an acid monomer in the monomer mixture used for making the copolymers mentioned above by emulsion polymerization. Acids used include acrylic, methacrylic, itaconic, aconitic, citraconic, crotonic, maleic, fumaric, the dimer of methacrylic acid, and so on.

The vinyl acetate copolymers are well-known and include copolymers such as vinyl acetate/butyl acrylate/2-ethylhexyl acrylate, vinyl acetate/butyl maleate, vinyl acetate/ethylene, vinyl acetate/vinyl chloride/butyl acrylate and vinyl acetate/vinyl chloride/ethylene. Throughout this specification the term "acrylic polymer" means any polymer wherein at least 50% by weight is an acrylic or methacrylic acid or ester of either thereof, including mixtures of such acids and esters individually and together. The term "vinyl acetate polymer" means any polymer containing at least 50% by weight of vinyl acetate. The term "vinyl acrylic polymer" shall mean a polymer comprised of vinyl acetate and acrylic acid, methacrylic acid, an acrylate ester, and/or a methacrylate ester as monomers. Examples of vinyl acrylic polymer latices include Res 3083 and Rovace 9100, from Rohm & Haas Company, Fulatex PD 126, from H. B. Fuller Co., and UCAR 6379G, from Union Carbide Corp. The term "styrenated acrylic polymer" shall mean a polymer comprised of styrene and acrylic acid, methacrylic acid, an acrylate ester, and/or a methacrylate ester as monomers. An example of a styrenated acrylic polymer latex is HG-74 from Rohm & Haas Company.

The aqueous polymer dispersions may be prepared according to well-known procedures, using one or more emulsifiers of an anionic, cationic, or nonionic type. Mixtures of two or more emulsifiers regardless of type may be used, except that it is generally undesirable to mix a cationic with an anionic type in any appreciable amounts since they tend to neutralize each other. The amount of emulsifier may range from about 0.1 to 6% by weight or sometimes even more, based on the weight of the total monomer charge. When using a persulfate type of initiator, the addition of emulsifiers is often unnecessary. This omission or the use of only a small amount, e.g., less than about 0.5%, of emulsifier, may sometimes be desirable from a cost standpoint, and less sensitivity of the dried coating or impregnation to moisture, and hence less liability of the coated substrate to be affected by moisture. In general, the molecular weight of these emulsion polymers is high, e.g., from about 100,000 to 10,000,000 viscosity average, most commonly above 500,000.

The foregoing and other emulsion polymer systems which may be pigmented with the pigment dispersions of the invention are set forth in the extensive literature on the subject, such as U.S. Pat. Nos. 3,035,004; 2,795,564; 2,875,166; and 3,037,952, for example.

The pigment dispersion may be added to polymer latex systems at any time during the preparation thereof, including during or after polymerization or copolymerization and by single or multiple additions. Normally, from about 0.1 % to about 10%, preferably 1–3%, by weight of pigment dispersion on polymer latex solids is adequate to provide suitable levels of pigmenting. However, the amount may be higher or lower depending on the particular system, other additives present, and similar reasons understood by the formulator.

This invention also relates to a method of coating a substrate comprising contacting a surface of a substrate with a composition comprising a latex paint binder and an inorganic pigment dispersion of this invention and drying said surface to form a film of said polymer in contact with said surface. Methods of coating substrates, e.g. roll coating and spray coating, are described in "Coating Methods", *Encyclopedia of Polymer Science and Engineering,* vol. 3, pp. 553–575 (John Wiley & Sons, Inc., N.Y., N.Y., 1985), the disclosure of which is incorporated herein by reference.

The following examples will serve to further illustrate the invention, but should not be construed to limit the invention, unless expressly set forth in the appended claims. All parts, percentages, and ratios are by weight unless otherwise indicated in context.

EXAMPLES

Polymer Preparation

Example 1

40% Styrene/30% Methacrylic Acid/30% Maleic Anhydride Terpolymer

Into a 0.5 liter round bottom reaction flask equipped with a thermometer, condenser, stirrer, nitrogen inlet, and several other addition inlets, was charged 26.4 grams maleic anhydride, 191.4 grams of isopropanol, and 22.3 grams of deionized distilled water. A nitrogen sweep was started and the contents of the reaction flask were heated to 80° C. To a 60 ml syringe attached to a micro delivery pump, was charged 50.3 grams of a 17.5% ammonium persulfate solution (initiator feed). To a 150 ml dropping addition flask, was charged a solution containing 35.2 grams of styrene and 26.4 grams of methacrylic acid (monomer feed). After the contents of the reaction flask reached 80° C., the initiator feed and monomer feed was started at a rate such that the feeds would be complete in about 2 hours. During the delivery of the initiator solution and monomer solution, the reaction temperature was maintained at about 80° C. The reaction temperature was maintained for an additional hour after all feeds were finished. Five ml of a 20% ammonium persulfate solution was added and allowed to react with residual monomer for one hour. The contents of the reaction flask were cooled to 25° C. and then 67.7 grams of 50% sodium hydroxide solution was added. The reaction mass was heated to reflux, to a maximum of 100° C., and 280.0 grams of an isopropanol-water azeotrope was removed while simultaneously adding 324.5 grams of diluting water. The diluting water was added at the same rate the azeotrope was removed. The reactor contents were cooled to 25° C. before discharging. The resulting copolymer solution was a clear yellow liquid with a Brookfield viscosity of 67 cps (spindle #2 at 60 rpm at 25° C.), solids of 27.4%, and a pH of 7.8.

Example 2

40% Styrene/30% Methacrylic Acid/30% Maleic Anhydride Terpolymer

Into a 0.5 liter round bottom reaction flask equipped with a thermometer, condenser, stirrer, nitrogen inlet, and several other addition inlets, were charged 26.4 grams maleic anhydride, 191.4 grams of isopropanol, and 22.3 grams of deionized distilled water. A nitrogen sweep was started and the contents of the reaction flask were heated to 80° C. To a 60 ml syringe attached to a micro delivery pump, was charged 50.3 grams of a 17.5% ammonium persulfate solution (initiator feed). To a 150 ml dropping addition flask, was charged a solution containing 35.2 grams of styrene and 26.4 grams of methacrylic acid (monomer feed). After the contents of the reaction flask reached 80° C., the initiator feed and monomer feed was started at a rate such that the feeds would be complete in about 2 hours. During the delivery of the initiator solution and monomer solution, the reaction temperature was maintained at about 80° C. The reaction temperature was maintained for an additional hour after all feeds were finished. Five ml of a 20% ammonium persulfate solution was added and allowed to react with residual monomer for one hour. The contents of the reaction flask were cooled to 25° C. and then 129.0 grams of a 29% ammonia solution was added. The reaction mass was heated to reflux, to a maximum of 100° C., and 280.0 grams of an isopropanol-water azeotrope was removed while simultaneously adding 242.8 grams of diluting water. The diluting water was added at the same rate the azeotrope was removed. The reactor contents were cooled to 25° C. before discharging and the pH of the polymer solution was adjusted to 8.8 with 29% ammonia solution. The resulting copolymer solution was a clear yellow liquid with a Brookfield viscosity of 48 cps (spindle #2 at 60 rpm at 25° C.), solids of 25.0%, and a pH of 8.8.

Example 3

40% Styrene/30% Methacrylic Acid/30% Maleic Anhydride Terpolymer

Repeat of Example 2, but styrene and methacrylic acid monomers were added to reaction flask before the start of the initiator feed. The resulting copolymer solution was a clear yellow liquid with a Brookfield viscosity of 208 cps (spindle #2 at 60 rpm at 25° C.), solids of 25.0%, and a pH of 8.15.

Example 4

40% Styrene/20% Methacrylic Acid/40% Maleic Anhydride

Into a 0.5 liter round bottom reaction flask equipped with a thermometer, condenser, stirrer, nitrogen inlet, and several other addition inlets, were charged 35.2 grams maleic anhydride, 191.4 grams of isopropanol, and 22.3 grams of deionized distilled water. A nitrogen sweep was started and the contents of the reaction flask were heated to 80° C. To a 60 ml syringe attached to a micro delivery pump, was charged 50.3 grams of a 17.5% ammonium persulfate solution (initiator feed). To a 150 ml dropping addition flask, was charged a solution containing 35.2 grams of styrene and 17.6 grams of methacrylic acid (monomer feed). After the contents of the reaction flask reached 80° C., the initiator feed and monomer feed were started at a rate such that the feeds would be complete in about 2 hours. During the delivery of the initiator solution and monomer solution, the reaction temperature was maintained at about 80° C. The reaction temperature was maintained for an additional hour after all feeds were finished. Five ml of a 20% ammonium persulfate solution was added and allowed to react with residual monomer for one hour. The contents of the reaction flask were cooled to 25° C. and then 73.8 grams of 50% sodium hydroxide solution was added. The reaction mass was heated to reflux, to a maximum of 100° C., and 280.0 grams of an isopropanol-water azeotrope was removed while simultaneously adding 245.9 grams of diluting water. The diluting water was added at the same rate the azeotrope was removed. The reactor contents were cooled to 25° C. before discharging. The resulting copolymer solution was a clear yellow liquid with a Brookfield viscosity of 170 cps (spindle #2 at 60 rpm at 25° C.), solids of 32.8%, and a pH of 8.3.

Example 5

40% Styrene/30% Methacrylic Acid/30% Maleic Anhydride Terpolymer

Repeat of Example 1, but 0.9 grams of diethylene glycol dimethacrylate was added to the monomer solution containing styrene and methacrylic acid. The resulting copolymer solution was a clear yellow liquid with a Brookfield viscosity of 120 cps (spindle #2 at 60 rpm at 25° C.), solids of 27.4%, and a pH of 7.90.

Example 6

40% Styrene/30% Methacrylic Acid/30% Maleic Anhydride Terpolymer

Repeat of example one, but 0.5 grams of diethylene glycol dimethacrylate was added to the monomer solution containing styrene and methacrylic acid. The resulting copolymer solution was a clear yellow liquid with a Brookfield viscosity of 42 cps (spindle #2 at 60 rpm at 25° C.), solids of 26.6%, and a pH of 8.00.

Example 7

40% Styrene/30% Methacrylic Acid/30% Maleic Anhydride Terpolymer

Into a reactor equipped with a thermometer, condenser, stirrer, nitrogen inlet, and several other addition inlets, charge 22.5 grams maleic anhydride, 148 grams of isopropanol, and 55 grams of deionized distilled water. A nitrogen sweep is started and the contents of the reaction flask are heated to dissolve the maleic anhydride. Make an initiator premix of 2.5 grams of t-butyl peroxyoctoate and 17.5 grams of isopropanol. Separately, make a monomer premix of 30 grams of styrene, 22.5 grams of methacrylic acid, and 0.3 grams of dodecyl mercaptan. Heat the contents of the reactor to reflux and begin feed of initiator premix and monomer premix at a rate such that the feeds would be complete in about 2 hours. During the delivery of the initiator solution and monomer solution, the reaction temperature was maintained at reflux. The reaction temperature was maintained for an additional two hours after all feeds were finished. Add 0.25 grams of additional t-butyl peroxyoctoate in 1.75 grams of isopropanol and allow to react for one to two hours. Titrate unreacted monomer to determine that unreacted monomer content is less than 1 % by weight. Add 90 grams of aqueous ammonia (at 29% by weight ammonia) over 1 hour while distilling isopropanol/water azeotrope. Add water as needed to adjust solids to 25% by weight to 30% by weight.

Comparative Example 1

100% Acrylic Acid Homopolymer

Polyacrylic acid in its neutralized form was used as the dispersing polymer.

Pigment Dispersion and Paint Preparation

A latex paint can be prepared from the following ingredients by the following procedure:

| Ingredients | Parts by Weight |
|---|---|
| Deionized water | 255.3 |
| Ethylene glycol (antifreeze) | 2.7 |
| Thickener (Natrosol Plus 300, Aqualon Co.) | 4.8 |
| Mix above 5 minutes, then add: | |
| Dispersant | (1% dispersant solids per total pigment solids) |
| Surfactant (Igepal CO-630, Rhone-Poulenc) | 2.7 |
| Biocide (Nuosept 95, Huls America) | 1.0 |
| Defoamer (Foamaster S, Henkel Corp.) | 2.0 |
| Titanium dioxide pigment (Tronox CR-800, Kerr McGee) | 85.1 |
| Kaolin clay (Glomax LL, DBK Corp.) | 102.2 |
| Calcium carbonate pigment (Duramite ECC Corp.) | 136.2 |

Grind above pigment dispersion for 10 minutes using a high speed Dispermat CV Model D 5226. Fineness-of-Grind should be 3–4 NS, then add:

| | |
|---|---|
| Texanol (2,2,4-trimethylpentanediol monoisobutyrate) | 7.6 |
| Defoamer (Foamaster A3, Henkel Corp.) | 2.0 |
| Deionized water | 37.5 |
| Vinyl acrylic resin (Res 3083, Rohm & Haas) | 153.2 |

Test paints are allowed to equilibrate 24 hours prior to testing. Test paints are applied to aluminum Q-Panels having a mill finish 3003 (0.025"×3"×9" dimension). Paints are applied 6 mils wet using a wet film applicator. Coated panels are then allowed to air dry horizontally for 24 hours. After 24 hours of film dry time, the panels are placed (coated side facing inside the chamber) on the QCT Weatherometer. This test method is a modified version of ASTM D 4585 with an internal chamber temperature of 100° F. Panels are rated hourly for the first eight hours with the final rating taken at hour 24. ASTM 0714 is used to rate both frequency and size of visible blisters. Prior to QCT testing, gloss values are taken using a BYK Gardner Micro TRI glossmeter.

| PAINT FILM DATA | |
|---|---|
| Dispersant | Paint Film Appearance |
| Example 1 | No blisters |
| Example 2 | No blisters |
| Example 5 | No blisters |
| Comparative Example 1 | Medium/Large blisters of medium/dense blister density |

What is claimed is:

1. A polymer useful as an inorganic pigment dispersant, said polymer being derive from monomers consisting essentially of at least 20% by weight of an ethylenically unsaturated aromatic monomer, at least 20% by weight of an ethylenically unsaturated dicarboxylic acid monomer, and at least 20% by weight of an ethylenically unsaturated monocarboxylic acid monomer, wherein the total amount of said ethylenically unsaturated dicarboxylic acid monomer and said ethylenically unsaturated monocarboxylic acid monomer provides an acid value of at least 300 an dis sufficient to permit said polymer to associate with an organic pigment in an aqueous medium in manner which disperse said inorganic pigment in said aqueous medium to form a stable aqueous dispersion of said inorganic pigment, wherein the amount of said ethylenically unsaturated aromatic monomer is sufficient to reduce the water sensitivity of a dried coating of a latex paint comprised of said stable aqueous dispersion of said inorganic pigment, and wherein the monomers from which said polymer is derived further comprise a multi-ethylenically unsaturated monomer.

2. A polymer as claimed in claim 1 wherein said multi-ethylenically unsaturated monomer is di-ethylenically unsaturated.

3. A polymer as claimed in claim 1 wherein said multi-ethylenically unsaturated monomer is selected from the group consisting of acrylate esters of polyols and methacrylate esters of polyols.

4. A polymer as claimed in claim 3 wherein said polyol is a diol.

5. A polymer as claimed in claim 1 wherein said multi-ethylenically unsaturated monomer comprises from about 0.01 % to about 3% of said monomers by weight based on the total weight of monomers.

6. A latex paint comprising a latex paint binder and inorganic pigment dispersion composition comprising, in an aqueous medium, an inorganic pigment and a dispersing polymer consisting essentially of at least 20% by weight of an ethylenically unsaturated aromatic monomer, at least 20% by weight of an ethylenically unsaturated dicarboxylic acid monomer, at least 20% by weight of an ethylenically unsaturated monocarboxylic acid monomer, wherein the total amount of said ethylenically unsaturated dicarboxylic acid monomer and said ethylenicaly unsaturated monocarboxylic acid monomer Is sufficient to permit said polymer to associate with an inorganic pigment in an aqueous medium in a manner which disperses said inorganic pigment in said aqueous medium to form a stable aqueous dispersion of said inorganic pigment and to provide said polymer with an acid value of at least 300, wherein the amount of said ethylenically unsaturated aromatic monomer is sufficient to reduce the water sensitivity of a dried coating of a latex paint comprised of said stable aqueous dispersion of said inorganic pigment, wherein said latex paint binder is comprised of a styrenated acrylic polymer, and wherein the monomers in said dispersing polymer further comprise a multi-ethylenically unsaturated monomer.

7. A latex paint comprising a latex paint binder and inorganic pigment dispersion composition comprising, in an aqueous medium, an inorganic pigment and a dispersing polymer consisting essentially of at least 20% by weight of an ethylenically unsaturated aromatic monomer, at least 20% by weight of an ethylenically unsaturated dicarboxylic acid monomer, and at least 20% by weight of an elhylenically unsaturated monocarboxylic acid monomer, wherein the total amount of said ethylenically unsaturated dicarboxylic acid monomer and said ethylenically unsaturated monocarboxylic acid monomer is sufficient to permit said polymer to associate with an inorganic pigment in an aqueous medium in a manner which disperses said inorganic pigment in said aqueous medium to form a stable aqueous dispersion of said inorganic pigment and to provide said polymer with an acid value of at least 300, wherein the amount of said ethylenically unsaturated aromatic monomer is sufficient to reduce the water sensitivity of a dried coating of a latex paint comprised of said stable aqueous dispersion of said inorganic pigment, wherein said latex paint tinder is comprised of a vinyl acrylic polymer, and wherein the monomers in said dispersing polymer further comprise a multi-ethylenically unsaturated monomer.

8. In a latex paint composition, the improvement wherein the composition contains an inorganic pigment dispersing quantity of a polymer derived from monomers consisting essentially of A) at least 20% by weight of an ethylenically unsaturated aromatic monomer, B) at least 20% by weight of an ethylenically unsaturated dicarboxylic acid monomer, C) at least 20% by weight of an ethylenically unsaturated monocarboxylic acid monomer; and wherein the monomers in said polymer further comprise a multi-ethylenically unsaturated monomer.

* * * * *